(12) United States Patent
Suvarna et al.

(10) Patent No.: US 10,583,561 B2
(45) Date of Patent: Mar. 10, 2020

(54) ROBOTIC VIRTUAL BOUNDARIES

(71) Applicant: Neato Robotics, Inc., Newark, CA (US)

(72) Inventors: Sarath Kumar Suvarna, Fremont, CA (US); Bryant Pong, San Jose, CA (US)

(73) Assignee: NEATO ROBOTICS, INC., Newark, CA (US)

( * ) Notice: Subject to any disclaimer, the term of this patent is extended or adjusted under 35 U.S.C. 154(b) by 0 days.

(21) Appl. No.: 15/996,290

(22) Filed: Jun. 1, 2018

(65) Prior Publication Data

US 2019/0061157 A1   Feb. 28, 2019

Related U.S. Application Data

(60) Provisional application No. 62/552,790, filed on Aug. 31, 2017.

(51) Int. Cl.
| | |
|---|---|
| *B25J 9/16* | (2006.01) |
| *B25J 11/00* | (2006.01) |
| *G05D 1/00* | (2006.01) |
| *G05D 1/02* | (2020.01) |

(52) U.S. Cl.
CPC ......... *B25J 9/1666* (2013.01); *B25J 9/1697* (2013.01); *B25J 11/0085* (2013.01); *G05D 1/0044* (2013.01); *G05D 1/024* (2013.01); *G05D 1/0263* (2013.01); *G05D 1/0274* (2013.01); *G05D 2201/0203* (2013.01); *Y10S 901/01* (2013.01); *Y10S 901/02* (2013.01); *Y10S 901/47* (2013.01)

(58) Field of Classification Search
CPC .................................. B25J 9/16; B25J 11/00
See application file for complete search history.

(56) References Cited

U.S. PATENT DOCUMENTS

| | | | | |
|---|---|---|---|---|
| 5,896,488 | A | * | 4/1999 | Jeong ................. G05D 1/0229 700/255 |
| 6,671,592 | B1 | | 12/2003 | Bisset et al. |
| 8,855,914 | B1 | | 10/2014 | Alexander et al. |

(Continued)

FOREIGN PATENT DOCUMENTS

WO       2007028049 A2     3/2007

OTHER PUBLICATIONS

All Home Robotics, Robotic Vacuums "Virtual Walls vs Lighthouses—What's are the Differences?", Retrieved on Jun. 1, 2018. Retrieved from the Internet: https://www.allhomerobotics.com/virtual-walls-vs-lighthouses/, 14 pages.

(Continued)

*Primary Examiner* — Kira Nguyen
(74) *Attorney, Agent, or Firm* — Kilpatrick Townsend & Stockton LLP

(57) ABSTRACT

In one embodiment, a virtual boundary is provided in the global coordinates of the area map and is converted into a plurality of line segments corresponding to a plurality of partial maps. In one embodiment, a physical boundary indicator is used during a training/mapping run, with the location added to the area map and the physical boundary indicator later moved. In one embodiment, the virtual boundary changes over time to change cleaning areas, act as a gate, change associated cleaning mode, etc. In one embodiment, virtual areas with boundaries are selected by a user.

12 Claims, 7 Drawing Sheets

(56) References Cited

U.S. PATENT DOCUMENTS

| | | |
|---|---|---|
| 8,903,589 B2 | 12/2014 | Sofman et al. |
| 8,996,172 B2 | 3/2015 | Shah et al. |
| 2008/0109126 A1 | 5/2008 | Sandin et al. |
| 2014/0012418 A1 | 1/2014 | Johnson et al. |
| 2016/0167234 A1* | 6/2016 | Angle .................. H04W 4/029 701/2 |
| 2016/0297072 A1* | 10/2016 | Williams ............. G05D 1/0274 |

OTHER PUBLICATIONS

DEEBOT R95, "Brighten up Your Life with a Customized Clean", Retrieved on Jun. 1, 2018. Retrieved from the Internet: https://www.ecovacs.com/global/deebot-robotic-vacuum-cleaner/DEEBOT-R95/, 18 pages.

United Kingdom Patent Application No. GB1814165.5 filed Aug. 31, 2018, Combined Search and Examination Report dated Feb. 20, 2019, 7 pages.

\* cited by examiner

ROBOTIC VIRTUAL BOUNDARIES

CROSS-REFERENCES TO RELATED APPLICATIONS

This application is a nonprovisional patent application of Ser. No. 62/552,790 entitled "Robotic Virtual Boundaries," filed Aug. 31, 2017, the disclosure of which is hereby incorporated in its entirety.

BACKGROUND OF THE INVENTION

The present invention relates to setting boundaries to limit where a robot can go, in particular a cleaning robot with a virtual boundary.

Neato robots are equipped with a magnetic sensor that can detect a magnetic field and allow the robot to make behavioral decisions. A user can place a magnetic strip along the floor to prevent the robot from crossing over the magnetic strip. iRobot provides a Lighthouse for its Roomba robot cleaner, which provides a Virtual Wall® boundary by emitting a cone-shaped infrared (IR) beam across doorways or other locations depending on placement of the Lighthouse by the user. The Lighthouse can also operate as a gate, allowing the robot to pass after an area on one side of the boundary is cleaned. The Ecovacs Deebot R95 provides a virtual boundary by allowing a user to draw a line on a map of the robot cleaning area to indicate a line where the robot will not cross. It is desirable to provide an improved virtual boundary system.

BRIEF SUMMARY OF THE INVENTION

In one embodiment, a user places a magnetic strip, IR transponder, or other boundary indicator at one or more locations during a map generating run for a robot. The robot records the boundary information in conjunction with the map as the locations in an area are mapped. The user can then remove the boundary indicator, or move it to another location for the same map generating run. Thereafter, the robot can identify a virtual boundary corresponding to the recorded boundary location, without the need for a physical boundary indicator to remain in place. Alternately, a user can place a label on the doorjamb of a room to indicate a virtual boundary. The label could be a bar code, a QR code, a black label detectable by IR, a color strip, a pattern, or any other label. The label could indicate that the robot should avoid the area, only clean and not map the area, use a special cleaning mode, etc.

In one embodiment, the virtual boundary changes over time. For example, the virtual boundary can be set to contain the robot to a high traffic area for every other cleaning routine. In another example, the virtual boundary can act as a gate, containing the robot to a certain area until the area is cleaned, then opening the boundary to allow the robot to clean another area, or to return to its home base. In another example, a particular cleaning mode can be associated with different times for the area indicated by the boundary, such as cleaning in a longitudinal direction at one time on a schedule, and cleaning in a latitudinal direction at another time.

In one embodiment, a user indicates a virtual boundary on an area map for a particular robot. The robot will then automatically correct the boundary, and may present a proposed correction to the user on a display. In one example, the robot determines that the virtual boundary does not extend all the way to a wall, and is not in fact a boundary because there is room for the robot to go around the line. The robot may suggest extending the boundary to the nearest wall. In another example, the robot may detect that the boundary is around an obstacle, and that the robot can move closer to the obstacle than the boundary line. The robot could then adjust the boundary to be closer to the obstacle. Alternately, the robot may determine the virtual boundary is too close to the object, and it bumps into the object or gets entangled in the object. The robot can then move the virtual boundary farther from the object to avoid problems.

In one embodiment, the robot generates its own virtual boundaries, or suggests a virtual boundary to a user. The robot may suggest a boundary where it detects a drop (e.g., stairs), or where it detects obstacles that may cause entanglement (e.g., wiring), or where it has gotten stuck before. The robot may set its own virtual boundaries, such as to avoid an area with a lot of obstacles that will take a lot of time to navigate, lifting the virtual boundary if it has sufficient battery life to clean the area.

In one embodiment, the robot needs to generate a map before the user can mark desired virtual boundaries. A training session may be needed to allow the robot to map the area and present the map to the user. To avoid a long delay, the robot can map the area by using wider lanes. Instead of covering every inch of the floor as in a normal cleaning mode, the robot covers the area within the range of its LIDAR or other mapping sensor. For example, this could mean 6 foot lanes for LIDAR, and optionally also moving along the walls. For an image-based SLAM algorithm, a single pass through a room may be sufficient.

In one embodiment, a user indicates a virtual boundary on an area map for a particular robot. The virtual boundary is provided to a remote server in the global coordinates of the area map. The virtual boundary is then downloaded to the robot. The robot converts the virtual boundary in global coordinates by segmenting the virtual boundary into a plurality of line segments corresponding to a plurality of partial maps. The line segments are converted into local coordinates for each partial map. Upon entering each partial map area, the robot compares the line segment to the partial map to determine the virtual boundary for the partial map.

In one embodiment, areas can be added to a map with virtual boundaries. The coordinates of the map are adjusted to account for new areas outside the original coordinate area (e.g., to the left of the 0, 0 coordinate). The coordinates of the virtual boundaries are also then adjusted to reflect the new coordinate system.

In one embodiment, the virtual boundary indicates an area, such as an area to be avoided or an area to be cleaned. The boundary area can be selected by a user indicating a particular one of a plurality of marked areas on a robot's global map.

DETAILED DESCRIPTION OF THE INVENTION

Overall Architecture

Figure 1:
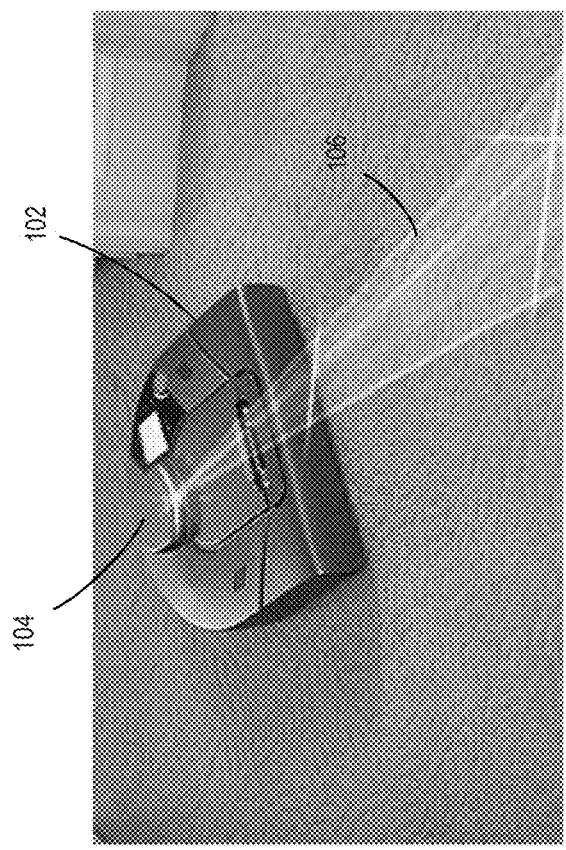
FIG. 1 is a diagram of a cleaning robot with a LIDAR turret according to an embodiment.

FIG. 1 is a diagram of a cleaning robot with a LIDAR turret according to an embodiment. A cleaning robot 102 has a LIDAR (Light Detection and Ranging) turret 104 which emits a rotating laser beam 106. Detected reflections of the laser beam off objects are used to calculate both the distance to objects and the location of the cleaning robot. One embodiment of the distance calculation is set forth in U.S. Pat. No. 8,996,172, "Distance sensor system and method," the disclosure of which is incorporated herein by reference. Alternately, VSLAM (Visual SLAM using image sensors) or other localization methods can be used. The collected data is also used to create a map, using a SLAM (Simultaneous Localization and Mapping) algorithm. One embodiment of a SLAM algorithm is described in U.S. Pat. No. 8,903,589, "Method and apparatus for simultaneous localization and mapping of mobile robot environment," the disclosure of which is incorporated herein by reference.

Figure 2:
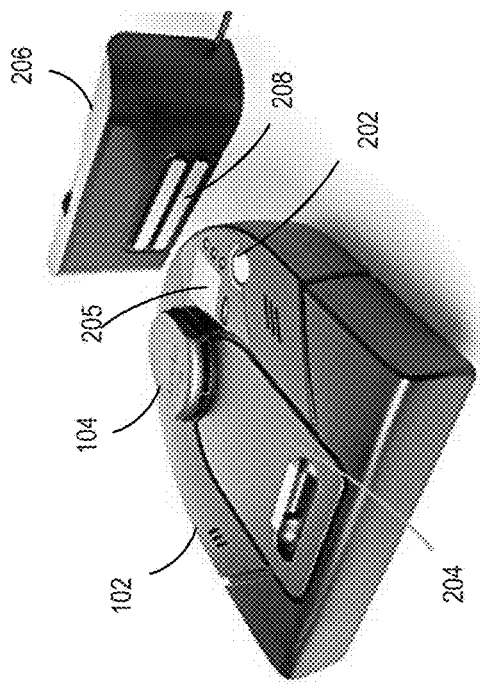
FIG. 2 is a diagram of a cleaning robot and charging station according to an embodiment.

FIG. 2 is a diagram of a cleaning robot and charging station according to an embodiment. Cleaning robot 102 with turret 10 is shown. Also shown is a cover 204 which can be opened to access a dirt collection bag and the top side of a brush. Buttons 202 allow basic operations of the robot cleaner, such as starting a cleaning operation. A display 205 provides information to the user. Cleaning robot 102 can dock with a charging station 206, and receive electricity through charging contacts 208.

Figure 3:
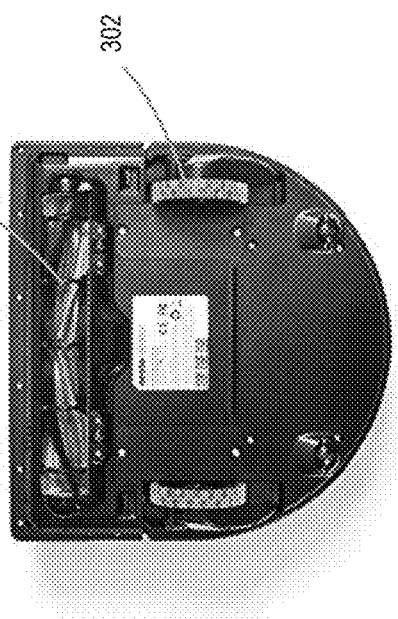
FIG. 3 is a diagram of the underside of a cleaning robot according to an embodiment.

FIG. 3 is a diagram of the underside of a cleaning robot according to an embodiment. Wheels 302 move the cleaning robot, and a brush 304 helps free dirt to be vacuumed into the dirt bag.

Figure 4:
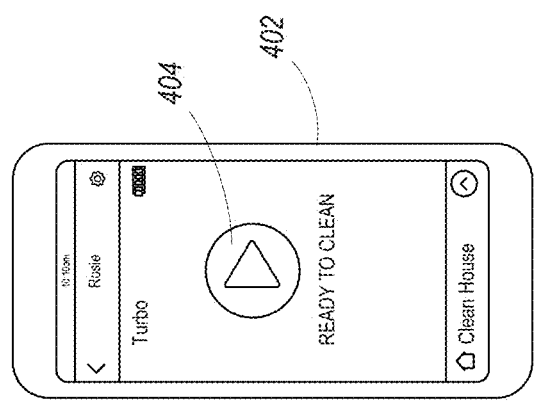
FIG. 4 is a diagram of a smartphone control application display for a cleaning robot according to an embodiment.

FIG. 4 is a diagram of a smartphone control application display for a cleaning robot according to an embodiment. A smartphone 402 has an application that is downloaded to control the cleaning robot. An easy to use interface has a start button 404 to initiate cleaning.

Figure 5:
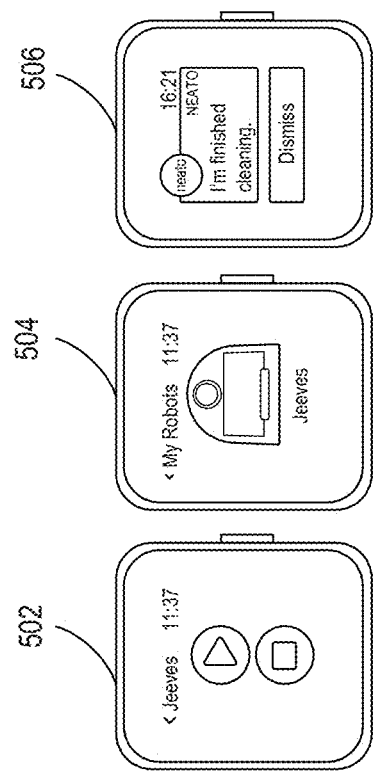
FIG. 5 is a diagram of a smart watch control application display for a cleaning robot according to an embodiment.

FIG. 5 is a diagram of a smart watch control application display for a cleaning robot according to an embodiment. Example displays are shown. A display 502 provides and easy to use start button. A display 504 provides the ability to control multiple cleaning robots. A display 506 provides feedback to the user, such as a message that the cleaning robot has finished.

Figure 6:
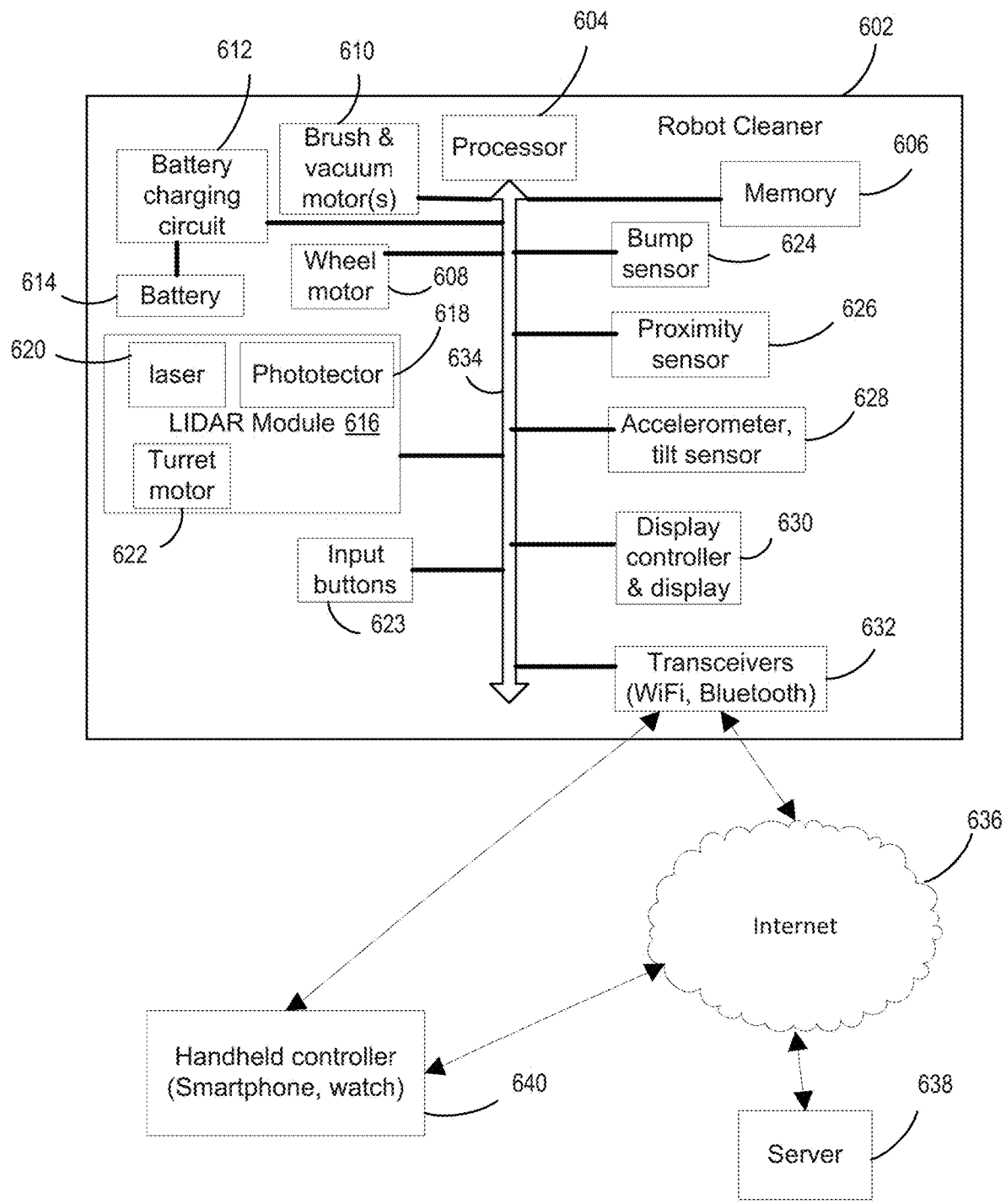
FIG. 6 is a diagram of a the electronic system for a cleaning robot according to an embodiment.

FIG. 6 is a high level diagram of a the electronic system for a cleaning robot according to an embodiment. A cleaning robot 602 includes a processor 604 that operates a program downloaded to memory 606. The processor communicates with other components using a bus 634 or other electrical connections. In a cleaning mode, wheel motors 608 control the wheels independently to move and steer the robot. Brush and vacuum motors 610 clean the floor, and can be operated in different modes, such as a higher power intensive cleaning mode or a normal power mode.

LIDAR module 616 includes a laser 620 and a detector 616. Alternately, an image sensor can be used with a VSLAM operation. A turret motor 622 moves the laser and detector to detect objects up to 360 degrees around the cleaning robot. There are multiple rotations per second, such as about 5 rotations per second. Various sensors provide inputs to processor 604, such as a bump sensor 624 indicating contact with an object, proximity sensor 626 indicating closeness to an object, and accelerometer and tilt sensors 628, which indicate a drop-off (e.g., stairs) or a tilting of the cleaning robot (e.g., upon climbing over an obstacle). Examples of the usage of such sensors for navigation and other controls of the cleaning robot are set forth in U.S. Pat. No. 8,855,914, "Method and apparatus for traversing corners of a floored area with a robotic surface treatment apparatus," the disclosure of which is incorporated herein by reference. Other sensors may be included in other embodiments, such as a dirt sensor for detecting the amount of dirt being vacuumed, a motor current sensor for detecting when the motor is overloaded, such as due to being entangled in something, a floor sensor for detecting the type of floor, and an image sensor (camera) for providing images of the environment and objects.

A battery 614 provides power to the rest of the electronics though power connections (not shown). A battery charging circuit 612 provides charging current to battery 614 when the cleaning robot is docked with charging station 206 of FIG. 2. Input buttons 623 allow control of robot cleaner 602 directly, in conjunction with a display 630. Alternately, cleaning robot 602 may be controlled remotely, and send data to remote locations, through transceivers 632.

Through the Internet 636, and/or other network(s), the cleaning robot can be controlled, and can send information back to a remote user. A remote server 638 can provide commands, and can process data uploaded from the cleaning robot. A handheld smartphone or watch 640 can be operated by a user to send commands either directly to cleaning robot 602 (through Bluetooth, direct RF, a WiFi LAN, etc.) or can send commands through a connection to the internet 636. The commands could be sent to server 638 for further processing, then forwarded in modified form to cleaning robot 602 over the internet 636.

Computer Systems for Media Platform and Client System

Figure 7:
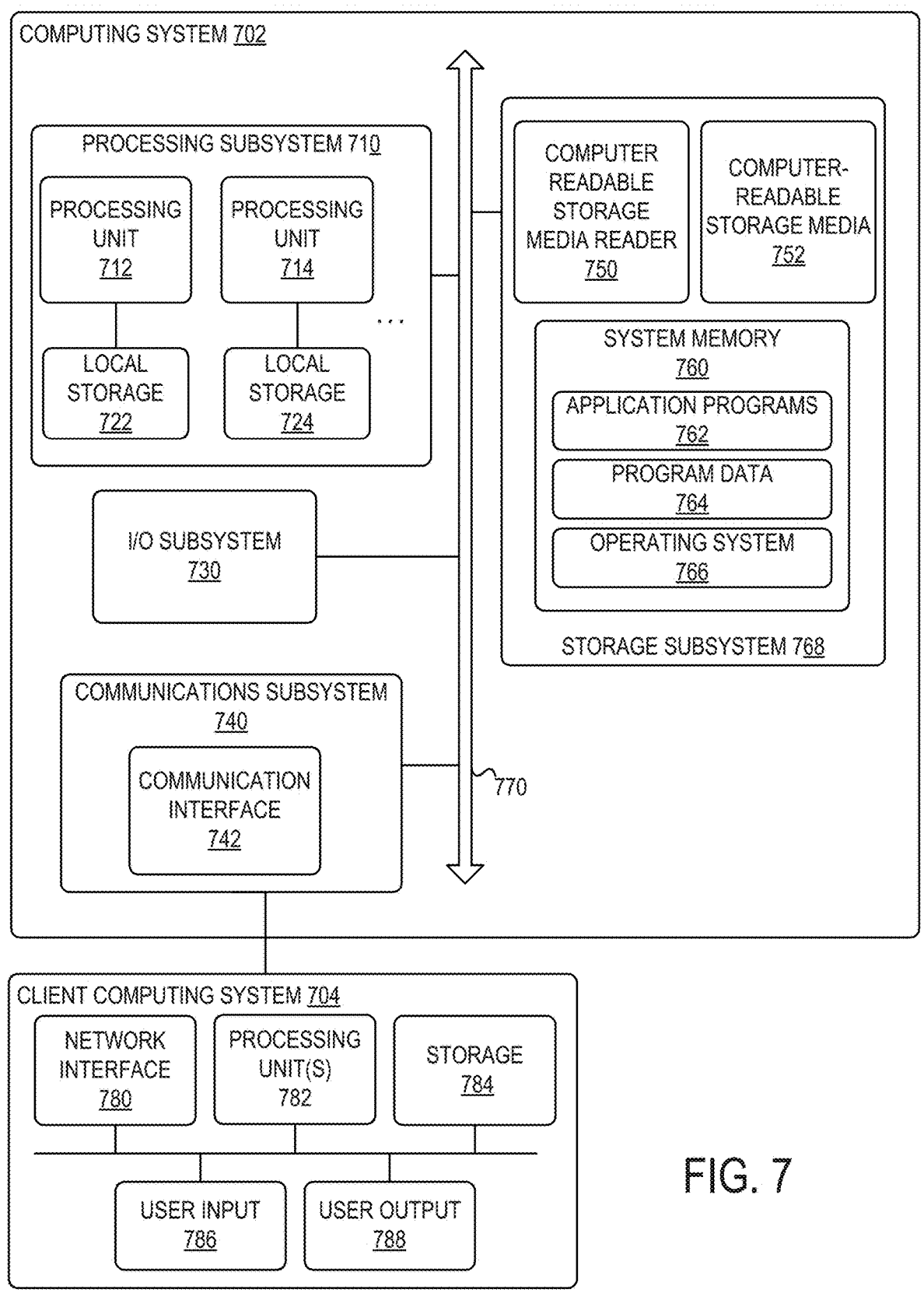
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the cleaning robot processor system, remote server, or any other computing system described herein or portions thereof. Client computing system 704 or similar systems may implement user devices such as a smartphone or watch with a robot cleaner application.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770.

These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

Virtual Boundaries

In one embodiment, a user first starts the robot in 'training' mode. In this mode, the robot will follow and explore the floor plan and build a map. The user can select a training icon or soft key on the robot application on a user device. The user will open doors and make sure the robot has access to all desired areas. After this procedure is complete, the robot will generate a coverage map showing the explored area and upload it to a remote server. The server will then download the coverage map to a user application on a user device, such as a mobile app. The user now has the choice of saving this map to use with the virtual boundaries or to cancel and retry exploration. Once the user is satisfied with the resulting exploratory map, the user now uses the mobile app to draw virtual boundaries. The app supports both insertion and deletion of boundaries. After the desired boundaries have been saved, the user can begin a cleaning run in which the robot honors these virtual boundaries. Honoring the virtual boundaries while cleaning is dependent on the robot localizing in the coverage map generated by a previous cleaning/training run.

In one embodiment, the user uses a finger on a touch screen to draw a virtual boundary on a map. Alternately, a stylus or other drawing element could be used, such as a mouse, thumbwheel, etc. Alternately, portions of the map can be labelled, and the user can indicate which portions are to be avoided by the robot, with the application then determining where the virtual boundaries need to be drawn to close such portions to the robot. The user could select the portions through a drop down list, touching the portions on the phone, typing in the labels, saying the labels (with voice recognition being used), etc. In one example, the user can toggle between cleaning a designated area, and marking it off-limits, by tapping the area. Each tap would toggle the setting between go and no-go. Different rooms on the map may be indicated by different colors, or colors or other visual indicators may be used to indicate areas to be cleaned and areas to be avoided. For example, cross-hatching may be superimposed over areas to be avoided on the map. The user could indicate the virtual boundaries on any device and have it transferred to another device. For example, the user may want to designate boundaries on a desktop computer display that is large, then have the marked map transferred to a smart phone for further interaction with the robot.

Figure 8:
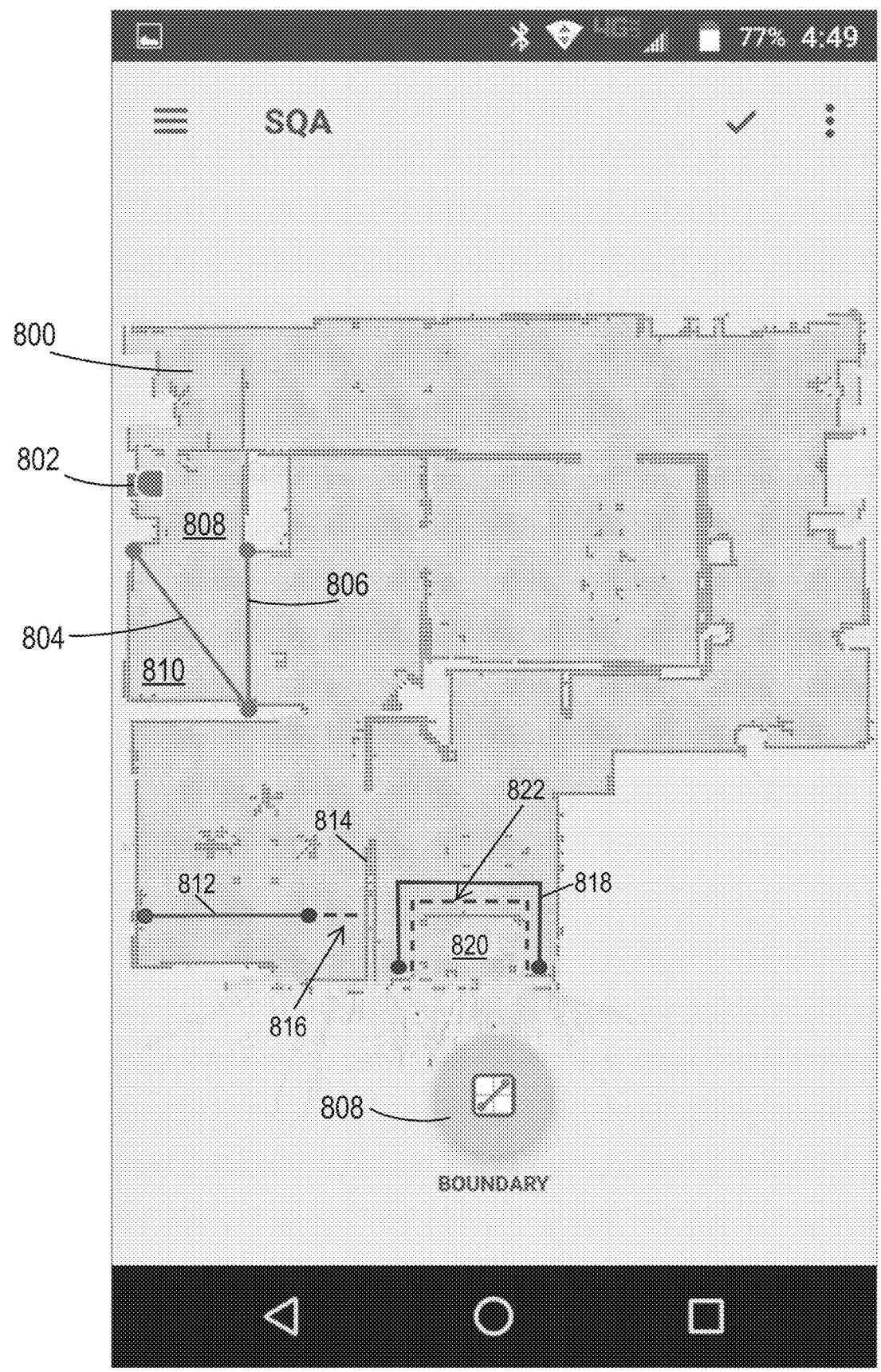
FIG. 8 is a diagram of a robot's global map with a user-drawn virtual boundary for a cleaning robot according to an embodiment.

FIG. 8 is a diagram of a robot's global map 800 with a user-drawn virtual boundaries 804 and 806 for a cleaning robot according to an embodiment. The robot location at base station 802 is shown. As can be seen, the virtual boundaries 804 and 806 will restrict the robot to portion 808 of the room it is in, and prevent the robot from going to portion 810 or other rooms. The user can initiate boundary drawing by touching boundary icon 808, then drawing lines 804 and 806 with the user's finger. Alternately, icon 808 can be dragged to the desired spot, and expanded, contracted, and rotated to place it in the desired location.

Boundary Extension

In one embodiment, a user indicates a virtual boundary 812 on the map 800. The robot will note there is a gap between the end of the boundary and a wall 814, allowing the robot to pass, and making the boundary meaningless. The robot can automatically correct the boundary, and may present a proposed correction of dotted line 816 to the user on a display, extending the virtual boundary to the nearest wall 814. If the user accepts the correction, the boundary is extended. In one embodiment, the boundary can be extended regardless, without a correction provided to the user, or in situations where the user does not respond.

Boundary Modification

In one embodiment, the robot may detect that the boundary is around an obstacle, and that the robot can move closer to the obstacle than the boundary line. The robot could then adjust the boundary to be closer to the obstacle. For example, a virtual boundary 818 may be drawn around an obstacle 820. The robot can determine that it can get closer to the obstacle without any problems, and may suggest a new virtual boundary 822. As in the extended boundary example above, if the user accepts the correction, the boundary is adjusted. In one embodiment, the boundary can be adjusted regardless, without a correction provided to the user, or in situations where the user does not respond. Alternately, the robot may determine the virtual boundary is too close to the object, and it bumps into the object or gets entangled in the object. The robot can then move the virtual boundary farther from the object to avoid problems.

In one embodiment, the robot generates its own virtual boundaries, or suggests a virtual boundary to a user. The robot may suggest a boundary where it detects a drop (e.g., stairs), or where it detects obstacles that may cause entanglement (e.g., wiring), or where it has gotten stuck before. The robot may set its own virtual boundaries, such as to avoid an area with a lot of obstacles that will take a lot of time to navigate, lifting the virtual boundary if it has sufficient battery life to clean the area. The robot can take a picture of the object behind a virtual boundary and send it to the user to aid in confirmation of the virtual boundary, or simply prompt the user to move the object.

In one embodiment, the robot senses objects, and object recognition is performed by the remote server or the robot. The objects can be sensed by imaging with a camera, an IR, ultrasonic or other sensor, or physical contact with a bump or contact sensor. The robot app may then automatically draw virtual boundaries to avoid hazardous areas, such as a tangle of wires by a TV, a pet's bowl of water on the floor, etc. The user could then accept the boundaries or be motivated to move the hazardous object(s).

In one embodiment, the robot may use the virtual boundaries to designate different types of cleaning areas, not just areas to be avoided. For example, a wooden or tile floor area may be indicated as requiring a different brush height, attachment, or different robot. A drop off may simply indicate an area to proceed with caution, using slower speed.

Battery Optimization Boundary Lines.

In one embodiment, the robot can draw temporary virtual boundaries around objects and areas that will take a long time to clean because of the tight maneuvering needed. The robot could then clean the easier areas, and lift the virtual boundaries if it has enough battery charge left to handle those areas.

In one embodiment, the robot can draw temporary virtual boundaries to optimize battery life. For example, a robot may need several charging cycles for cleaning a large floor plan. A typical robot charging cycle would run the battery down to less than 10%, then recharge to about 80%. The charging takes longer above 80%, so this optimizes total cleaning time (cleaning+charging time). The robot may determine, for example, that it would achieve a faster total cleaning time by drawing a virtual boundary that blocks off the last portion (say 20%) of a floor plan, then recharging only to 60% or whatever amount is needed to clean that last portion. This could be more efficient than cleaning all but 5%, then having to wait to charge to 80% again, when a lower charge would be sufficient for the last 5% plus the added amount behind the virtual boundary.

Training Run.

In one embodiment, the robot needs to generate a map before the user can mark desired virtual boundaries. A training session may be needed to allow the robot to map the area and present the map to the user. To avoid a long delay, the robot can map the area by using wider lanes. Instead of covering every inch of the floor, the robot covers the area within the range of its LIDAR or other mapping sensor. For example, this could mean 6 foot lanes for LIDAR, and optionally also moving along the walls. For an image-based SLAM algorithm, a single pass through a room may be sufficient. Alternately, the user can manually direct the robot around the borders of the areas to be cleaned with a remote control. Anything outside those borders may be detected and mapped, and marked with a virtual boundary.

In one embodiment, the process is made as seamless as possible for the user. The user can simply place the robot down and click a "start clean" button. In one embodiment, the display can then prompt the user whether to go ahead and clean everything, or do a training run to map the area, and present the map to the user to mark any virtual boundaries. Alternately, the robot could simply initiate a training run, and provide the map and suggested boundaries to the user after it is prepared, while starting a full cleaning run using the suggested virtual boundaries, until they are rejected, or added to, by the user. The map can be provided directly to a user, such as using a local WiFi network, Bluetooth, or any other transmission technology, to transmit to a user device, such as a smart phone, tablet, or computer. Alternately, the map can be sent to a remote server, then downloaded to the user device.

Partial to Global Maps.

Figure 9:
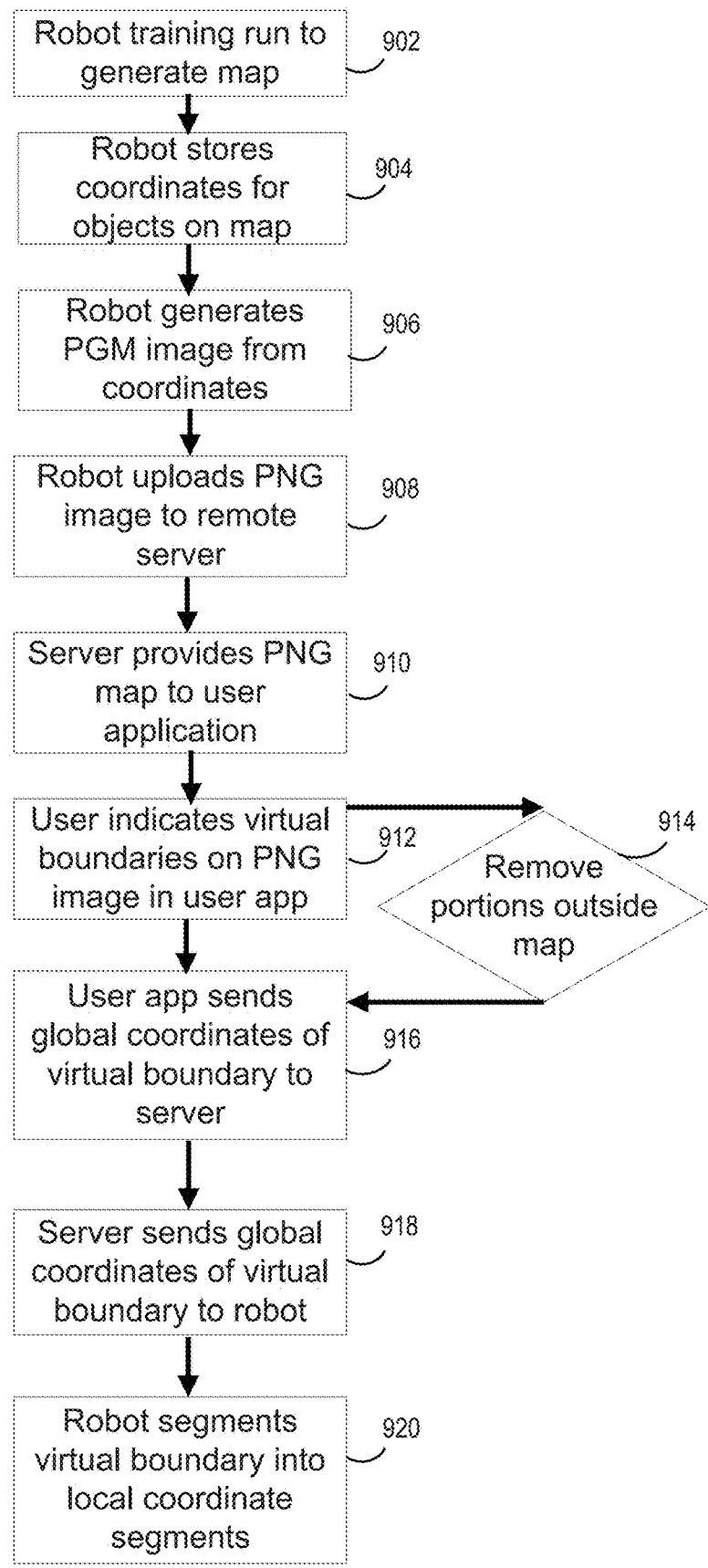
FIG. 9 is a flow chart of a process for generating virtual boundary segments for partial maps according to an embodiment.

FIG. 9 is a flow chart of a process for generating virtual boundary segments for partial maps according to an embodiment. The robot maps its environment during a training run (902). Optionally, the robot can also be cleaning during the training run. The robot uses its sensors and a SLAM (simultaneous localization and Mapping) algorithm to map the area, and generate coordinates of objects (walls, obstacles, etc.) on that map (904). The robot generates a Portable Network Graphics (PNG) image of the map from the stored coordinates (906). The PNG map is then uploaded to a remote server (908). A Portable Graymap Format (PGM) image of the map is also generated for debugging purposes.

The server, through the Internet or other network or communication channel, provides the PNG map to an application running on a user device (910). The user indicates the virtual boundaries on the map (912) as indicated with respect to FIG. 8 above. The user app removes any portions of the drawn boundaries that are outside the map (914). If a line does not extend all the way to a wall, or otherwise won't work as a barrier to any area, the app can prompt the user to extend the line, or could automatically extend it. The user app calculates the global coordinates of the virtual boundaries, and sends them to the server (916). The server provides the global coordinates of the virtual boundaries to the robot (918). The robot segments the virtual boundary into segments corresponding to partial maps stored in a memory of the robot, and converts the global coordinates into local coordinates for the partial maps. The partial maps can correspond to the desired range of a LIDAR or other localization system on the robot. The partial maps can overlap to ensure complete coverage and the ability to track location when moving from one partial map to another. In one embodiment, the partial maps are 5×5 meter areas, or another dimension less than 10 meters in any cross-section.

As the robot executes a cleaning run, it will access each partial map as needed, and will also access the local coordinates of the virtual boundary segment for that partial map. The robot processor will continuously detect its current location using a LIDAR or other mechanism, and will compare its coordinates to the coordinates of the virtual boundary segments. When a boundary segment is reached, the robot will change direction. The robot will detect when the front edge of the robot is sufficiently close to the boundary to still allow the robot to turn, move to the adjacent uncleaned swath, and then reverse direction to continue cleaning.

Coordinates Revision.

Figure 10:
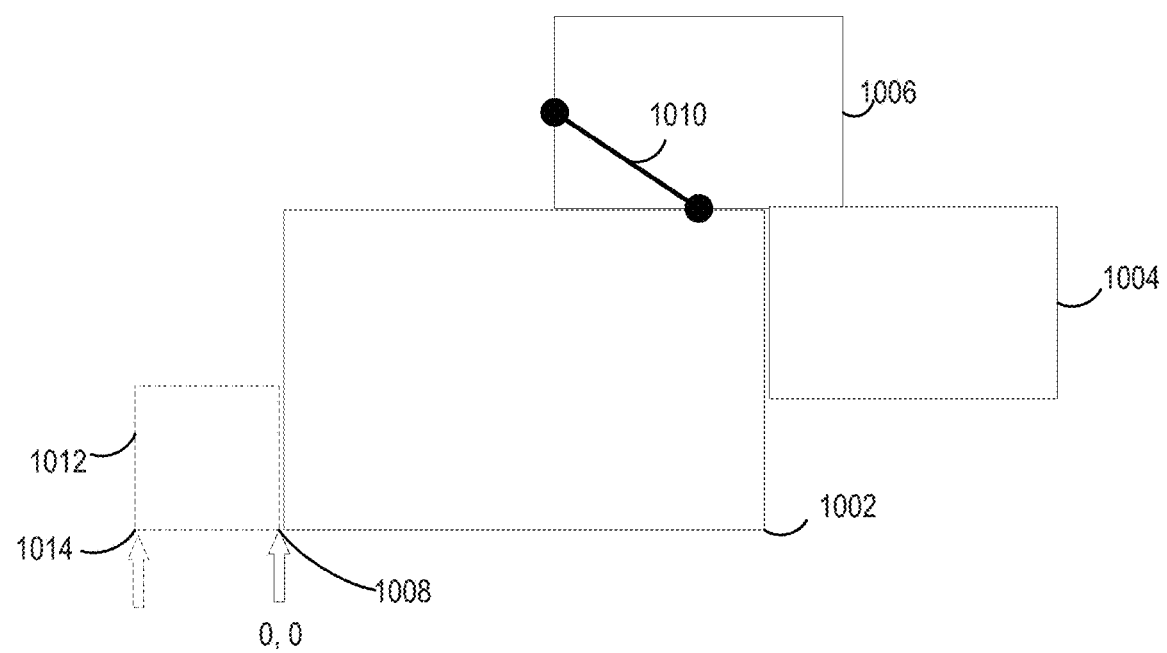
FIG. 10 is a diagram illustrating an embodiment for updating a map coordinate system.

FIG. 10 illustrates an embodiment for updating a coordinate system. As shown, the robot has drawn an initial map with rooms 1002, 1004, and 1006. A coordinate system was set up starting at 0, 0 at point 1008. A user has then drawn a virtual boundary 1010 on the map. An area 1012 was previously blocked off, with a closed door, virtual or physical boundary or otherwise. If area 1012 is subsequently opened up, it will need to be added to the map and the coordinates will be changed, starting with changing the 0, 0 point to a point 1014. This will require a change in coordinates for the other points on the map, including the points making up virtual boundary 1010. The difference between points 1008 and 1014 can simply be added to each point on the map for the new coordinate space.

Removable Physical Boundary Indicator.

In one embodiment, a user places a magnetic strip, IR transponder, or other boundary indicator at one or more locations during a map generating run for a robot. The robot records the boundary information in conjunction with the map as the locations in an area are mapped. The user can then remove the boundary indicator, or move it to another location for the same map generating run. For example, the user may move the boundary indicator to the next door or hallway entrance the robot will encounter. Thereafter, the robot can identify a virtual boundary corresponding to the recorded boundary location, without the need for a physical boundary indicator to remain in place. Thus, instead of the user marking the boundary on a map, the robot generates the boundaries as it generates the map and each partial map. The robot may extend boundaries that don't go all the way to a wall, or make them closer to an object, as discussed above. The boundary segment is stored in the robot's local memory for each partial map. When the mapping is completed, the robot generates a PNG image of the map that includes the virtual boundaries delineated on the map. The PNG image with the virtual boundaries is then uploaded to the server, and then downloaded to the app on the user device.

In one embodiment, the user can then confirm the boundaries and the map, or modify it. For example, the user may realize the boundary is not in exactly the right location, such that the robot, for example, would clean up to an inch from a door, but not the area up to the edge of the door or under the door.

In one embodiment, the virtual boundary changes over time. For example, the virtual boundary can be set to contain the robot to a high traffic area for every other cleaning routine. The user can indicate the virtual boundaries on a map by any of the mechanisms described above, or any other mechanism. The user can then associate the map with a schedule, such as every Tuesday at noon, for example. The user can then pull up another unmarked copy of the map, and indicate a separate set of virtual boundaries, or no virtual boundaries. The user can then associate that marked map with another time on the schedule, such as every other Saturday at 5 PM. The app will then upload the schedule and the multiple line segments in global coordinates to the server. The server will then download the schedule and virtual boundaries to the robot. The robot will convert the first schedule virtual boundaries into partial map segments as described above. The boundaries and schedule time are stored in reference to the appropriate partial maps. The same partial maps in memory are also used for a second or further virtual boundary segments and schedule times. The schedule may also indicate that certain areas are to have more intense cleaning, such as a slower robot cleaner speed and/or higher vacuum power, or other operational modifications of the robot cleaner operation. The intensive cleaning or other operational modifications may also be in a non-scheduled mode. For example, the user can draw a section to go over in turbo or gentle mode on the map on the app, and then have the robot immediately go to that section. Thus, the virtual boundaries or other indication of areas for different treatment may be indicated by the user for either a scheduled or non-scheduled operation. For an immediate operation, the user indication can be discarded after the operation, or the user may be prompted to save or schedule the operation with the virtual boundaries.

In another example, the virtual boundary can act as a gate, containing the robot to a certain area until the area is cleaned, then opening the boundary to allow the robot to clean another area, or to return to its home base. A program stored in the robot's memory recognizes when all areas completely bounded by walls, obstacles and virtual boundaries have been cleaned. The robot will then be instructed to head to the virtual boundary, but the command to stop when the coordinates match the virtual boundary is inhibited. The robot then cleans the next enclosed area, or, if already clean, can head to home.

In another example, a particular cleaning mode can be associated with different times for the area indicated by the boundary, such as cleaning in a longitudinal direction at one time on a schedule, and cleaning in a latitudinal direction at another time. This can provide a more thorough cleaning over time, without requiring multiple passes in multiple directions during a single cleaning run, thus limiting the time for a single cleaning run.

In one embodiment, the a preview of the map with the virtual boundaries is provided to the user for acceptance. The robot app may make suggestions based on the virtual boundaries and schedule, such as a suggested relocation of the base station in view of the virtual boundaries to optimize the cleaning time.

In one embodiment, multiple global maps are provided, such as where the robot is moved to different floors. Each floor can have its own map, and its own virtual boundaries and schedules.

In one embodiment, the robot has one or more indicators that will show a user when it has encountered a virtual boundary. The indicator can be a light that flashes red when a boundary is reached. This will inform the user that the reason the robot is turning around is because of the virtual boundary. The indicator can also be a visible line of light projected in both directions from the robot to indicate the full extent of the virtual boundary. The light may flash, be a different color, or otherwise indicate a permanent virtual boundary versus one for just this scheduled time. This may prompt the user to reset the virtual boundary if the situation has changed, such as the user just had a party in a room that otherwise is rarely used. The feedback may also be audible, and can come directly from the robot, or be indicated by the app on the user device. In one embodiment, if the app is open on the user device, the feedback is provided on the user device. If the app is closed, the feedback is provided from the robot itself.

In one embodiment, the user can set the virtual boundary by using the robot app on the mobile device like a remote control. When the user observes the robot approaching an off-limits room, the user can push a virtual boundary button on the app. A signal is then sent to the robot, either directly (using IR, Bluetooth, local WiFi, etc.), or through the server (over then Internet then a local area network to the robot). The robot will recognize the point as part of a line, and will automatically extrapolate the point to the walls on either side of the point if it recognizes a doorway.

Multiple Robots.

In one embodiment, multiple cleaning robots are used. This provides a variety of advantages. Upon initial use, one robot can be designated as the training robot, mapping the area and suggesting virtual boundaries. The second ($3^{rd}$, $4^{th}$, etc.) robot can follow behind, doing a normal cleaning, and thus taking more time in each room or space. The training robot can transmit each room of the map as it is generated to the second robot, so the second robot need not do mapping and need not include the processing needed for mapping. This transmission can be direct, by way of a user device, or by uploading to a remote server which then downloads to the second robot. In one example, the new robot may be a replacement robot. Multiple maps for multiple floors or floor plans can be shared. For example, a second robot normally on a second floor may detect that it has been moved to the first floor, and can switch over to the first floor map.

Virtual lines may be drawn based on robot type, or simply a division of duties. With multiple robots, each can be assigned a portion of the area to be cleaned, with the areas handled by other robots being blocked off with virtual boundaries. Thus, different virtual boundaries would be provided to each robot. Cheaper robots could be used for easier to clean areas, such as hardwood floors. Or different robots could have different, optimized battery storage. For one example, a training or mapping robot could have only mapping and image taking capability, and no cleaning apparatus, with limited battery power for a short training run. Thus, the training robot could be much smaller and cheaper. The cleaning robots could have much more battery power for extended cleaning runs.

User Interactions.

In one embodiment, the robot has a camera and can provide images or video to the user to indicate virtual boundary areas. The user could direct the camera viewpoint via remote control for a better view of the area. Also, the user commands to generate a virtual boundary can be by any method, not simply drawing a line with a finger or stylus on a displayed map. For example, the robot could map areas and identify them, such as by image recognition (dishwasher means it's the kitchen, etc.), or by prompting the user to label areas from the map and/or images. The user could then simply say, for example, "don't clean the kitchen," and the robot will draw virtual boundaries at the entrances to the kitchen. Alternately, object or areas could be identified on a map, and a user could tap them to place off limits, and double tap to remove the virtual boundaries (or vice-versa). The robot would then draw a virtual boundary around the indicated object or area. Alternately, drop down menus could be used after tapping, or any other GUI interface.

In one embodiment, the user can take pictures of areas or objects to be avoided, and the program on the robot (or a program in the user device or a remote server) can match those to images in a visual SLAM mapping, or to images linked to a LIDAR SLAM mapping, or any other method. Virtual boundaries could then be drawn around the objects or areas in the image. Artificial Intelligence could be used to automatically crop the image, just like where a robot may move a drawn virtual boundary closer to an object when it discovers it can get closer to the object without difficulty.

While the invention has been described with respect to specific embodiments, one skilled in the art will recognize that numerous modifications are possible. Embodiments of the invention may be realized using a variety of computer systems and communication technologies including but not limited to specific examples described herein. For example, embodiments of the invention can be applied to not just cleaning robots, but other robots, such as lawn mowing robots (certain areas may need mowing more often, or flowers may need to be avoided with a virtual boundary). Virtual boundaries can indicate what areas don't need to be monitored by a security robot, or don't need to be checked as often. Robots for measuring temperature, air quality, or other functions may similarly use virtual boundaries.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for operating a robot comprising:
   detecting a physical boundary marker using sensors on the robot;
   indicating a virtual boundary corresponding to a location of the physical boundary marker on an area map for the robot;
   maintaining the virtual boundary when the physical boundary marker is subsequently removed;
   avoiding, by the robot, an area beyond the virtual boundary;
   detecting a gap between the physical boundary marker or the virtual boundary and an adjacent wall; and
   extending the virtual boundary to the adjacent wall.

2. The method of claim 1 further comprising:
   receiving an indication of the virtual boundary on the area map from a user.

3. The method of claim 2 further comprising:
   developing the area map during a training run of the robot and providing the area map to a user before receiving the indication of the virtual boundary.

4. The method of claim 3 further comprising:
   traveling, during the training run, a distance and pattern sufficient for generating the area map, without traveling a full distance and pattern required to clean the areas indicated on the area map.

5. The method of claim 1 further comprising:
   providing the virtual boundary to a remote server in the global coordinates of the area map;
   downloading the virtual boundary to the robot;
   converting, by the robot, the virtual boundary in global coordinates into segments by segmenting the virtual boundary into a plurality of line segments corresponding to a plurality of partial maps; and
   comparing, by the robot, the line segment to a current partial map to determine the virtual boundary for the current partial map.

6. The method of claim 1 wherein the physical boundary marker is one of a magnetic strip, an IR beam, a bar code, a QR code, a color strip, an IR detectable label, or a visual pattern.

7. A method for operating a robot comprising:
   detecting a physical boundary marker using sensors on the robot;
   indicating a virtual boundary corresponding to a location of the physical boundary marker on an area map for the robot;
   maintaining the virtual boundary when the physical boundary marker is subsequently removed;
   avoiding, by the robot, an area beyond the virtual boundary
   determining that the robot can move a different distance from an object behind the virtual boundary than the virtual boundary; and
   adjusting the virtual boundary to be a different distance from the object.

8. A non-transitory, computer readable medium for mounting on a robot, comprising instructions which, when executed by a computer, cause the computer to:
- detect a physical boundary marker using sensors on the robot;
- indicate a virtual boundary corresponding to a location of the physical boundary marker on an area map for the robot;
- maintain the virtual boundary when the physical boundary marker is subsequently removed;
- avoid, by the robot, an area beyond the virtual boundary
- detecting a gap between the physical boundary marker or the virtual boundary and an adjacent wall; and
- extending the virtual boundary to the adjacent wall.

9. A non-transitory, computer readable medium for mounting on a robot, comprising instructions which, when executed by a computer, cause the computer to:
- detect a physical boundary marker using sensors on the robot;
- indicate a virtual boundary corresponding to a location of the physical boundary marker on an area map for the robot;
- maintain the virtual boundary when the physical boundary marker is subsequently removed;
- avoid, by the robot, an area beyond the virtual boundary;
- determining that the robot can move a different distance from an object behind the virtual boundary than the virtual boundary; and
- adjusting the virtual boundary to be a different distance from the object.

10. A cleaning robot, comprising:
- a floor-traversing robot;
- a robot housing of the floor-traversing robot;
- a motor mounted in a housing for moving the floor-traversing robot;
- a battery connected to provide electrical power to the motor;
- a sensor mounted in the robot for detecting surroundings;
- a processor mounted in the robot;
- a memory in the robot;
- a localization module in the robot;
- non-transitory, computer-readable code in the memory having instructions for:
  - detecting a physical boundary marker using sensors on the robot;
  - indicating a virtual boundary corresponding to a location of the physical boundary marker on an area map for the robot;
  - maintaining the virtual boundary when the physical boundary marker is subsequently removed;
  - avoiding, by the robot, an area beyond the virtual boundary;
  - detecting a gap between the physical boundary marker or the virtual boundary and an adjacent wall; and
  - extending the virtual boundary to the adjacent wall.

11. The cleaning robot of claim 10 wherein the non-transitory, computer-readable code in the memory has further instructions for:
- providing the virtual boundary to a remote server in global coordinates of the area map;
- downloading the virtual boundary to the robot;
- converting, by the robot, the virtual boundary in global coordinates into segments by segmenting the virtual boundary into a plurality of line segments corresponding to a plurality of partial maps; and
- comparing, by the robot, the line segment to a current partial map to determine the virtual boundary for the current partial map.

12. The cleaning robot of claim 10 wherein the non-transitory, computer-readable code in the memory has further instructions for:
- developing the area map during a training run of the robot and providing the area map to a user; and
- receiving an indication of a virtual boundary on the area map from the user.

* * * * *